United States Patent
Ting et al.

(10) Patent No.: US 8,983,195 B2
(45) Date of Patent: Mar. 17, 2015

(54) SMOOTHING METHOD AND APPARATUS FOR TIME DATA SEQUENCES

(71) Applicant: Industrial Technology Research Institute, Hsinchu (TW)

(72) Inventors: Wen-Hung Ting, Tainan (TW); Chien-Chun Kuo, Tainan (TW); Wen-Yang Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 13/726,461

(22) Filed: Dec. 24, 2012

(65) Prior Publication Data

US 2014/0093183 A1 Apr. 3, 2014

(30) Foreign Application Priority Data

Sep. 28, 2012 (TW) .............................. 101136015 A (51) Int. Cl.
*G06K 9/00* (2006.01)
*G06T 7/20* (2006.01)

(52) U.S. Cl.
CPC ......... *G06T 7/20* (2013.01); *G06T 2207/30241* (2013.01)
USPC .......................................... 382/190; 345/581

(58) Field of Classification Search
None
See application file for complete search history.

(56) References Cited

U.S. PATENT DOCUMENTS

| | | |
|---|---|---|
| 4,158,887 A | 6/1979 | Kosugi |
| 4,561,061 A | 12/1985 | Sakamoto et al. |
| 4,686,632 A | 8/1987 | Schrieber |
| 5,121,442 A | 6/1992 | Togawa et al. |
| 5,214,754 A | 5/1993 | Okamoto et al. |
| 5,231,697 A | 7/1993 | Yamada |
| 5,261,033 A | 11/1993 | Oka |
| 5,267,184 A | 11/1993 | Matsushiro et al. |
| 5,269,000 A | 12/1993 | Ohuchi |
| 5,287,441 A | 2/1994 | Nakamura |
| 5,325,477 A | 6/1994 | Klassen |
| 5,363,479 A | 11/1994 | Olynyk |
| 5,367,617 A | 11/1994 | Goossen et al. |

(Continued)

FOREIGN PATENT DOCUMENTS

| | | |
|---|---|---|
| TW | 187439 | 7/1992 |
| TW | 1257590 | 7/2006 |

(Continued)

OTHER PUBLICATIONS

Park et. al., "Efficient Fingertip Tracking and Mouse Pointer Control for a Human Mouse", International Conference on Computer Vision Systems (ICVS 2003), pp. 88-97, Apr. 1, 2003.

(Continued)

*Primary Examiner* — Hadi Akhavannik
(74) *Attorney, Agent, or Firm* — Rabin & Berdo, P.C.

(57) ABSTRACT

According to one exemplary embodiment, a smoothing method for time data sequences is performed, which includes: smoothing original data points of a time data sequence, then from smoothed data points, determining reference points for a global trajectory and a local trajectory; according to the reference points, calculating a direction of the global trajectory and a direction of the local trajectory; and adaptively calculating new data point(s) by integrating the two directions. The trajectory of new data points maintains the properties of smoothness and real-time perception.

16 Claims, 10 Drawing Sheets

(56) References Cited

U.S. PATENT DOCUMENTS

| | | |
|---|---|---|
| 5,410,645 A | 4/1995 | Ooka et al. |
| 5,416,897 A | 5/1995 | Albers et al. |
| 5,422,990 A | 6/1995 | Siverbrook et al. |
| 5,425,109 A | 6/1995 | Saga et al. |
| 5,473,742 A | 12/1995 | Polyakov et al. |
| 5,479,590 A | 12/1995 | Lin |
| 5,500,927 A | 3/1996 | Sander-Cederlof et al. |
| 5,594,853 A | 1/1997 | Salesin et al. |
| 5,613,053 A | 3/1997 | Albers et al. |
| 5,638,503 A | 6/1997 | Hoel |
| 5,694,535 A | 12/1997 | Broekhuijsen |
| 5,731,820 A | 3/1998 | Broekhuijsen |
| 5,737,508 A | 4/1998 | Feigenbaum |
| 5,818,459 A | 10/1998 | Kurumida |
| 5,877,743 A | 3/1999 | Dzik |
| 5,898,439 A | 4/1999 | Takazawa |
| 6,014,148 A | 1/2000 | Tankelevich |
| 6,044,165 A | 3/2000 | Perona et al. |
| 6,067,094 A * | 5/2000 | Schuster ............ 345/441 |
| 6,111,588 A | 8/2000 | Newell |
| 6,195,100 B1 * | 2/2001 | Tibbett ............ 345/581 |
| 6,204,861 B1 | 3/2001 | Chen |
| 6,298,155 B1 | 10/2001 | Mitsunaga et al. |
| 6,304,677 B1 | 10/2001 | Sshuster |
| 6,317,651 B1 | 11/2001 | Gerstenberger et al. |
| 6,441,823 B1 | 8/2002 | Ananya |
| 6,512,847 B1 | 1/2003 | Gnutzmann |
| 7,072,812 B2 | 7/2006 | Corr |
| 7,405,733 B2 | 7/2008 | Helie et al. |
| 7,463,270 B2 | 12/2008 | Vale et al. |
| 7,609,278 B1 | 10/2009 | Dash |
| 7,969,440 B1 | 6/2011 | Polyakov et al. |
| 2003/0048277 A1 * | 3/2003 | Maillot et al. ............ 345/582 |
| 2004/0001113 A1 | 1/2004 | Zipperer et al. |
| 2009/0027398 A1 | 1/2009 | Frisken |
| 2009/0099717 A1 | 4/2009 | Yabushita et al. |

FOREIGN PATENT DOCUMENTS

| | | |
|---|---|---|
| TW | 200844870 | 11/2008 |
| TW | 200910147 | 3/2009 |
| TW | 201016020 | 4/2010 |
| TW | 1328396 | 8/2010 |
| TW | 201104513 | 2/2011 |
| TW | 1341484 | 5/2011 |
| TW | 1349888 | 10/2011 |
| TW | 1355615 | 1/2012 |
| TW | 201204054 | 1/2012 |
| TW | 201218070 A | 5/2012 |

OTHER PUBLICATIONS

Javanovic et. al., "MarkerMouse: Mouse Cursor Control Using a Head-Mounted Marker", International Conference on Computers Helping People With Special Needs ICCHP 2010, pp. 49-56, Jul. 14, 2010.

Gutwin et. al., "Using Cursor Prediction to Smooth Telepointer Jitter", International Conference on Supporting Group Work (ACM SIGGROUP 2003), pp. 294-301, Nov. 9, 2003.

Zheng et. al., "A New Method for the Discerning of Point Moving Targets' Tracks", International Congress on Image and Signal Processing (IEEE CISP 2009), pp. 1-5, Oct. 17, 2009.

Mei et. al., "Curve fitting and optimal interpolation on CNC machines based on quadratic B-splines", Science China (SC 2010), vol. 53, pp. 1-18, Jan. 2010.

Taiwan Patent Office, Office Action, Patent Application Serial No. TW101136015, Sep. 18, 2014, Taiwan.

* cited by examiner

SMOOTHING METHOD AND APPARATUS FOR TIME DATA SEQUENCES

CROSS-REFERENCE TO RELATED APPLICATION

The present application is based on, and claims priority from, Taiwan Patent Application No. 101136015, filed Sep. 28, 2012, the disclosure of which is hereby incorporated by reference herein in its entirety.

TECHNICAL FIELD

The present disclosure relates generally to a smoothing method and apparatus for time data sequences.

BACKGROUND

Moving objects in tracked images often cause unstable object positioning due to change of color characteristics or shape of objects, for example, the distress caused by non-easy aligning with the target in applications of semi mouse's movement functions. In the past, smoothing technology of data points often uses complex smoothing algorithms and iterative techniques, for example, uses curve fitting and regression error analysis to modify the jitter curve, to immediately response the user's operation trajectory, and depict on the screen. This kind technique of smoothing data points need to solve simultaneous equations, thus computation amount and memory requirements are greater. This technique may achieve a good smoothing effect, but also induce the time delay.

Figure 1:
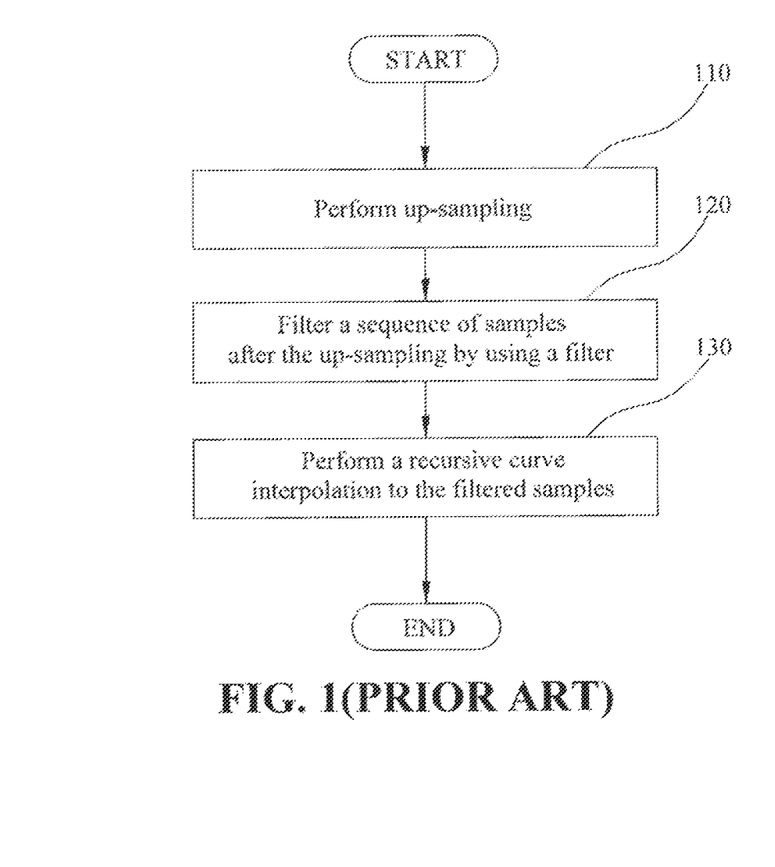
FIG. 1 shows a schematic for a generation technique of computerized curve.

FIG. 1 shows a schematic for a generation technique of computerized curve. As shown in the operation flow of FIG. 1, this technique performs an up-sampling (step 110) for the inputted data, and filters a sequence of samples after the up-sampling (step 120), and then performs a recursive curve interpolation to the filtered samples (step 130) to obtain a best curve. Some techniques of smoothing data points collect an amount of data for a period of time, then perform a data smoothing correction including such as performing noise reduction, smoothing the points of segment, and then curve fitting the points of segment to obtain a best curve.

The mouse cursor smoothing techniques such as one technology uses headset notations and controls the mouse cursor with a head facing direction. When the mouse cursor enters into a support position mode, this technology determines a new mouse cursor position based on a detection position and the average of the positions of a last point. Some tracking technologies for a mouse cursor controls the mouse cursor with the fingertips, and predicts a next cursor position according to the position and the speed of a current cursor, and performs an interpolation action at a low sampling frequency to maintain ease and smoothness of the cursor control. Some mouse cursor smoothing techniques use predicting cursor methods to alleviate timing jitter impact of network transmission for remote cursor control, and predict the next cursor position in accordance with the last cursor's position and speed, and the cursor's average acceleration.

Figure 2:
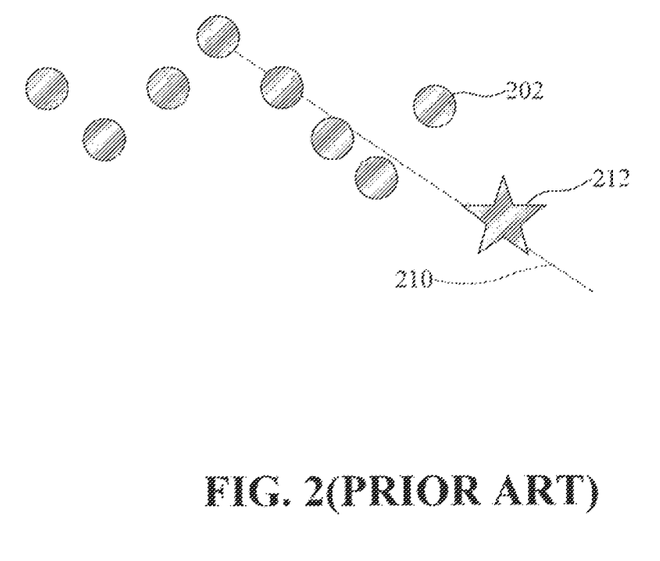
FIG. 2 shows a schematic view of a technology of tracking a moving object for improving the search strategy.

Another technique of tracking a moving object improves the search strategy when tracking a moving target. As shown in FIG. 2, before detecting an object, this technology determines a search range based on the object's previous trajectory, such as the four data of the previous trajectory of a real object 202, and uses the direction of a least-square trend line 210 to predict the possible position 212 of this object at a next time point.

In the above mentioned curve smoothing technologies, some technologies achieve good smoothing effects, but do not immediately smooth data, which is unable to match the user expectation for the applications such as emphasizing real-time perception of gesture-like mouse trajectory. Some mouse cursor smoothing technology may be unable to overcome the problem of jitter due to more serious jitter of the data points, or to smoothly correct the trajectory when there is a gap between the cursor's true position and the predicted position. Some mouse cursor tracking technologies only predict the next cursor position with the current speed direction, and may cause a large error at a turning point. Some moving target tracking technologies predict an object target with a trend line, which may also cause a large error at a turning point. General curve generation technologies use the regression analysis to obtain only an orientation prediction, and may not directly provide the calculation of an absolute position.

Therefore, it is an important issue on how to design a trajectory smoothing mechanism with a balance between the global and the local trajectory trends, effective controlling the time delay within a small number of sampling points, and using simple trajectory smoothing techniques by simple algebra operations to achieve the effect of reducing the computation amount.

SUMMARY

The exemplary embodiments of the disclosure may provide a smoothing method and apparatus for time data sequences.

One exemplary embodiment relates to a smoothing method for time data sequences. The method is executed by a hardware processor to perform: smoothing a plurality of original data points of a time data sequence, then from a plurality of smoothed data points, determining a plurality of reference points for a current global-trajectory trend and a current local-trajectory trend; calculating a global trajectory direction and a local trajectory direction of the time data sequence; according to the plurality of reference points; and adaptively calculating at least one new data point by integrating the global trajectory direction and the local trajectory direction.

Another exemplary embodiment relates to an apparatus for time data sequences. The smoothing apparatus comprises a hardware-implemented smoothing unit and a hardware-implemented prediction unit. The smoothing unit is configured to smooth a plurality of original data points of a time data sequence, and determine a plurality of reference points for a current global-trajectory trend and a current local-trajectory trend, from a plurality of smoothed data points. The prediction unit is configured to calculate a global trajectory direction and a local trajectory direction of the time data sequence according to the plurality of reference points; and adaptively calculates at least one new data point by integrating the global trajectory direction and the local trajectory direction.

BRIEF DESCRIPTION OF THE DRAWINGS

FIG. 9A to FIG. 9I show a schematic views illustrating the inputted original trajectory incrementing with time and the outputted smoothed trajectory, according to an exemplary embodiment.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a smoothing technique for a time data sequence. This technique uses a curve fitting method to smooth historical original data points of a time data sequence, then performs local sampling from the smoothed data points and determines reference points with a global trajectory trend and a local trajectory trend in the smoothed data points. This technique further calculates a proceed direction for global data and a proceed direction for a current data according to the reference points with obtained trends, and adaptively calculate new data point(s).

Figure 3:
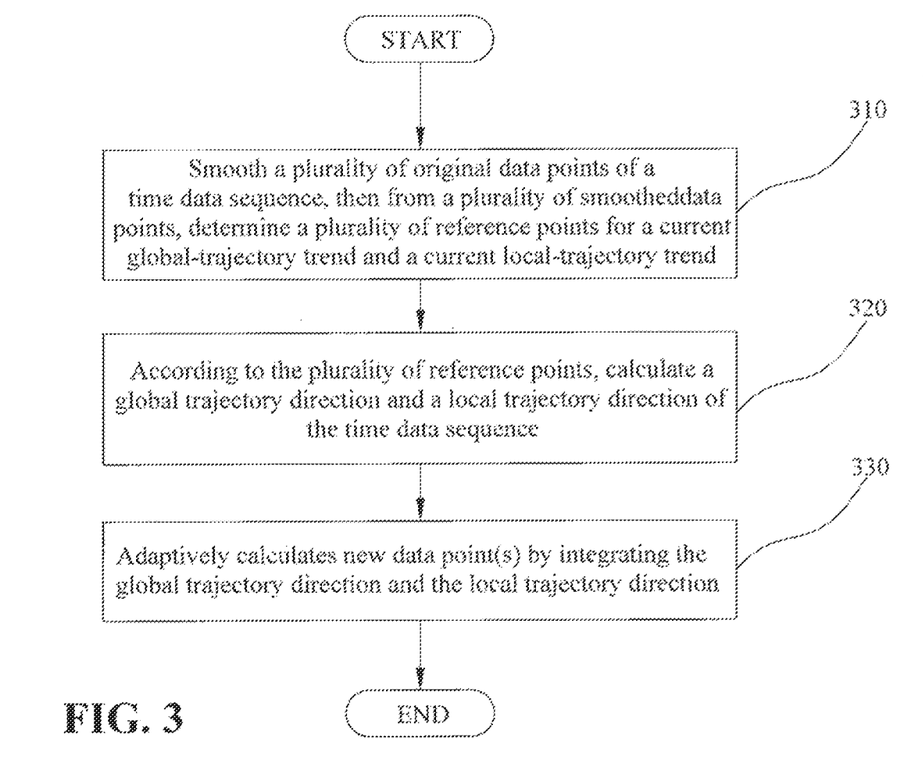
FIG. 3 shows a smoothing method for a time data sequence, according to an exemplary embodiment.

In other words, the disclosed exemplary embodiment of a smoothing method for a time data sequence is shown as in FIG. 3. The smoothing method smoothes a plurality of original data points of a time data sequence, then from a plurality of smoothed data points, determines a plurality of reference points for a current global-trajectory trend and a current local-trajectory trend (step 310), and then according to the plurality of reference points, calculates a global trajectory direction and a local trajectory direction of the time data sequence (step 320). The smoothing method further adaptively calculates new data point(s) by integrating the global trajectory direction and the local trajectory direction (step 330). The smoothing method performs steps 310 to 330 by using a hardware processor. This hardware processor may be, but not limited to, such as a hardware circuit having a computing capability, or a computer system equipped with at least one central processing unit and at least one memory. The smoothing method may also outputs an original trajectory incrementing with time, smoothed trajectory, fitting curve, and so on. The trajectory formed by the new data sequence has smoothness and immediate perceptual characteristics, and the detailed will be described in the following.

Figure 4A:
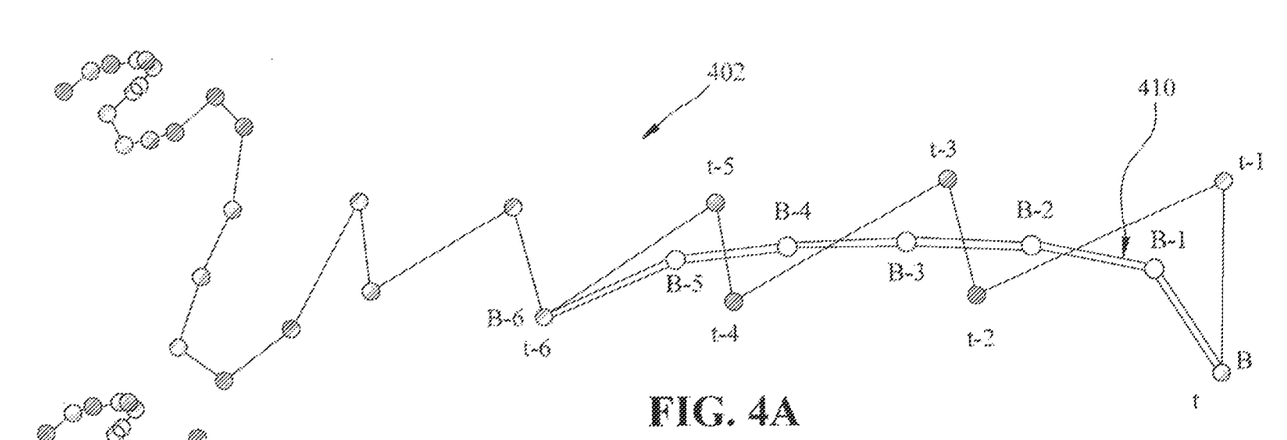
FIG. 4A and FIG. 4B show a schematic view for smoothing the original data sequence in FIG. 3, according to an exemplary embodiment.
Figure 4B:
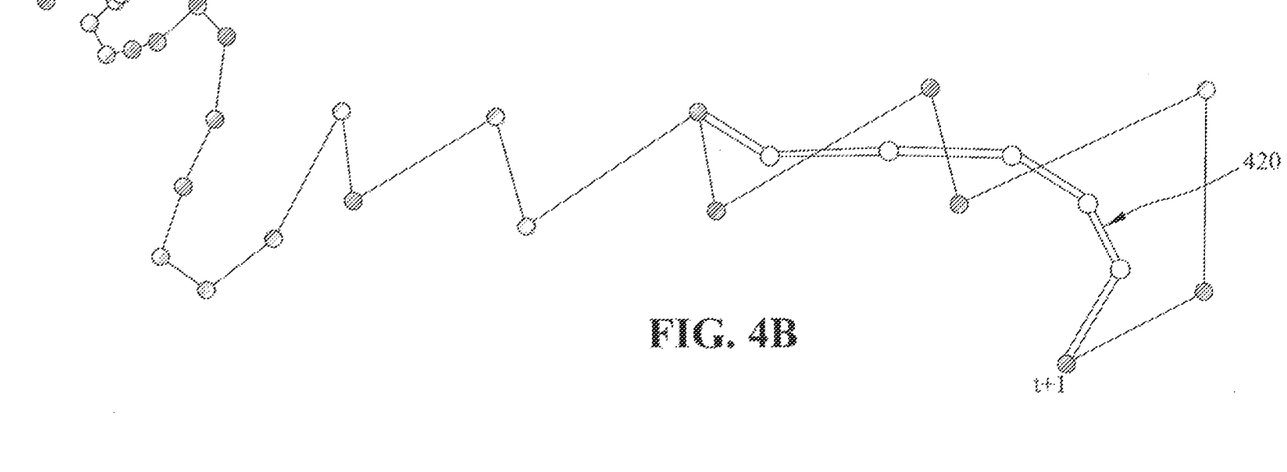

FIG. 4A and FIG. 4B show a schematic view for smoothing the original data sequence in FIG. 3, according to an exemplary embodiment. FIG. 4A shows a schematic view illustrating the use of a curve-fitting technique, such as the B-spline curve fitting method. In FIG. 4A, an smoothing operation is performed on a plurality of original data points of a time data sequence 402, then a plurality of smoothed data points are selected from these smoothed data points. The plurality of original data points for smoothing, for example, are 7 historical original data points, respectively, i.e. original data points at time t−6, t−5, t−4, t−3, t−2, t−1 and t represents the current time. For example, curve 410 uses the B-Spline curve fitting technique to smooth 7 historical original data points, and selects 7 smoothed data points from therein. These 7 smoothed data points are respectively, B−6, B−5, B−4, B−3, B−2, B−1, and B, wherein the smoothed data point B−6 is the original data point at time t−6, the data point B is the original data point at time t. It may be seen from FIG. 4A, smoothed data points B−6, B−5, B−4, B−3, B−2, B−1 and B are with the same number as 7 original history data points before treatment, so spacing of the 7 smoothed data points is similar to the spacing of the 7 original history data points. However, the curvature of the curve 410 formed by smoothed data points is much lower (that is, smoother), and the data at the front and the end of the curve are not changed. The disclosed exemplary embodiments of the smoothing method for time data sequences may use any method such as an interpolation, or a regression, or a curve fitting, wherein data storage structure may use such as a queue with a data structure of first-in first-out to maintain unchanged number of sampling points. In other words, in the disclosed exemplary embodiments of the smoothing method, the number of the plurality of original data points maintaining for smoothing operation is equal to the number of the plurality of smoothed data points. The plurality of original data points are the historical original data points by tracking back the time data sequence 402 from a current time.

Following the FIG. 4A, FIG. 4B shows a schematic view illustrating the situation of inputting original data points at next time t+1. As may be seen from the FIG. 4B, the curve 420 formed by smoothed data point changes with the inputted original data point, and may sufficiently represent the original trajectory condition. The number of sampling points only increases the calculation amount, and its effect is the same for the needs of the subsequent processing. Therefore, it may take the number of the sampling points with a lowest calculation amount.

Following the FIG. 4A and FIG. 4B, FIG. 5A and FIG. 5B shows a schematic view illustrating the determination of the reference points by using the trajectory trend, according to an exemplary embodiment. The curve trend may be obtained by performing a linear regression analysis on local sampling data points, such as the dotted line 506 shown in FIG. 5A. The obtained dotted line 506 describes a possible trajectory trend under the situation that the original data points are tracked from the current time t back to the time t−6, wherein the original data points are local sampled and a linear regression analyzed is performed for the local sampled data points. Dotted line 516 in FIG. 5B describes a possible trajectory trend under the situation that an original data point at the next time t+1 is inputted, wherein the original data points are also local sampled and a linear regression analyzed is performed for the local sampled data points. The exemplary embodiments using the curve fitting to obtain absolutely smoothed data points may also provide a directional prediction effects as performing a regression analysis, and the detailed will be described in the following.

Figures 5A, 5B:
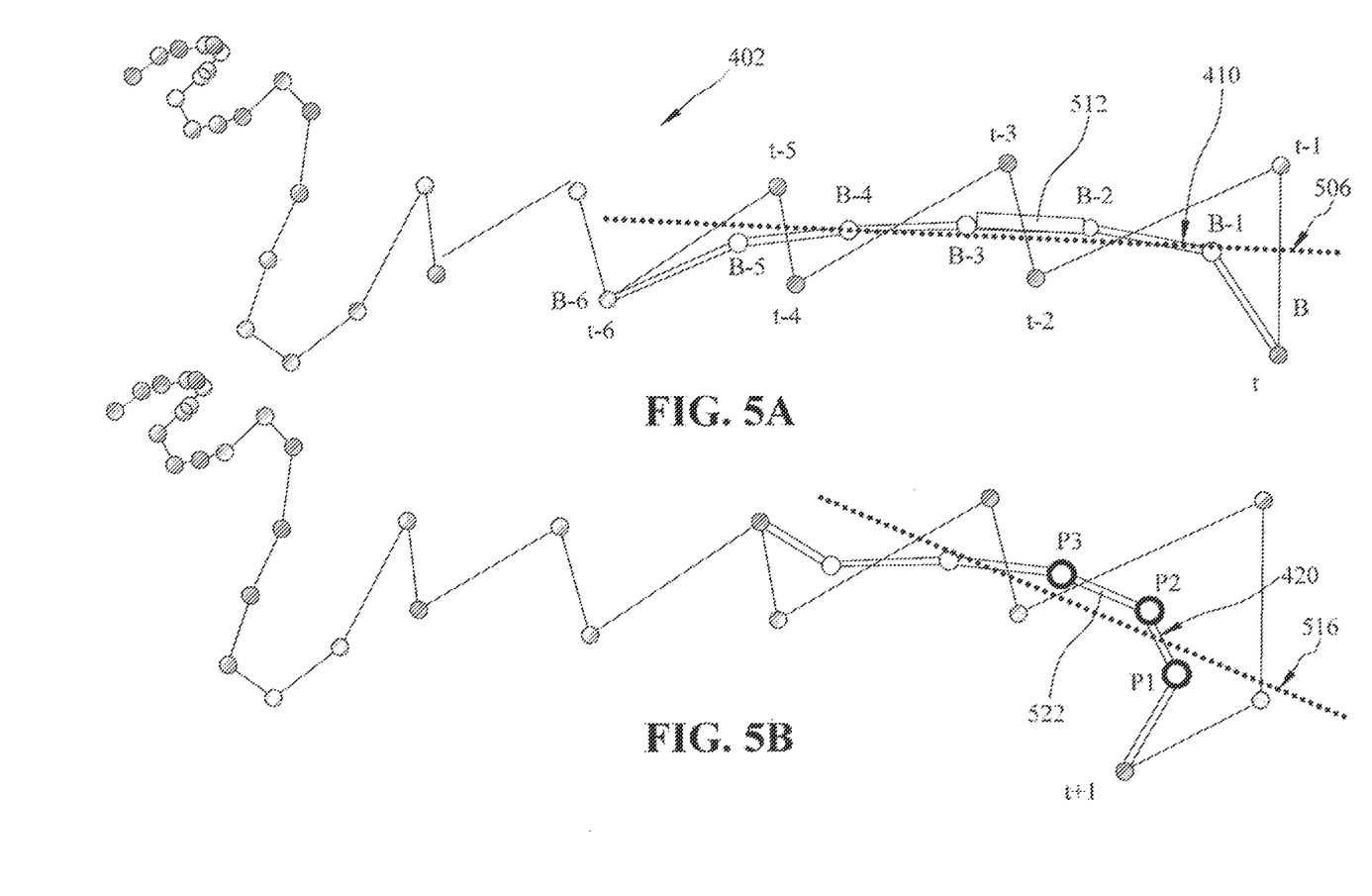
FIG. 5A and FIG. 5B shows a schematic view illustrating the determination of the reference points by using the trajectory trend, according to an exemplary embodiment.

It may be from FIG. 5A and FIG. 5B, for smoothed data points on B-Spline, the connection direction between two consecutive back-tracked smoothed data points from a current smoothed data point is similar to the results of the regression analysis. For example, the connection direction between the back-tracked second and third data points i.e. the connection of P2 and P3 in FIG. 5B, from the current smoothed data point P1, is similar to the results of regression analysis. In other words, the back-tracked second and third data points of the smoothed data points on the curve 410 in FIG. 5A, denoted by the representative reference section 512, is similar to the curve trend of the dotted line 506 obtained by the regression analysis; while the connection direction of the back-tracked second and third data points of the smoothed data points on the curve 420 in FIG. 5B, denoted by the representative reference section 522, is similar to the curve trend of the dotted line 516 obtained by the regression analysis. In other words, directly using the direction of the representative reference section such as reference section 512 or 522 may approximate the results of the regression analysis. Therefore, the regression analysis step may be omitted to reduce the calculation amount. The disclosed exemplary embodiments of the smoothing technique also take the tracked-back first data point as a reference point of a current data trend to ensure immediate reaction of the current data trend. In the exemplar, the smoothing method may select, but not be limited to, three reference points for the current trend, which are the tracked-back first, second, and third data points, i.e., P1, P2, and P3, from the current data point.

In other words, according to the exemplary embodiment, in the plurality of reference points of the trajectory trend, there are a first reference point, and a second and a third reference points. The first reference point is the tracked-back first smoothed data point from a current time, which may ensure immediate reaction of local movements, while the connection direction of the second and the third reference points is a representative direction for the current global-trajectory trend. The number of the reference points of aforementioned trajectory trends may not be limited to a fixed number.

Figure 6:
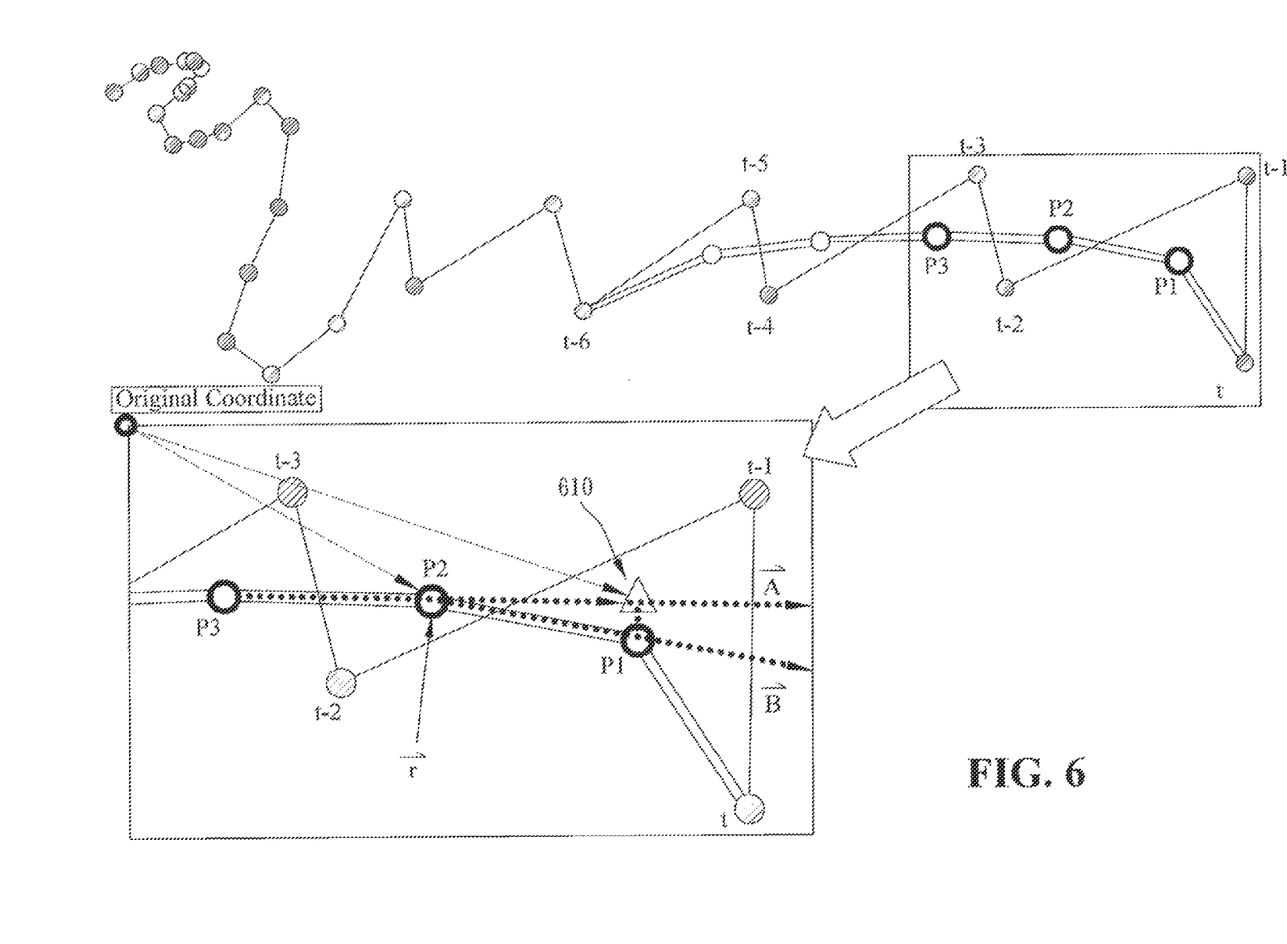
FIG. 6 shows a schematic view of calculating the trajectory direction and predicting a distance by referring to the reference points, according to an exemplary embodiment.

After having obtained the plurality of reference points such as P1, P2 and P3, the smoothing technique may calculate such as the global trajectory direction and the local trajectory direction of the time data sequence 402, and may further adaptively calculate at least one new data point. The adaptive calculation for the at least one new data point may include such as defining the global trajectory direction and the local trajectory direction according to the plurality of reference points, and calculating a predicted length and determining a reference direction vector and a displacement point. FIG. 6 shows a schematic view of calculating the trajectory direction and predicting a distance (length) by referring to the reference points such as P1, P2, and P3, according to an exemplary embodiment.

In FIG. 6, the smoothing technique takes the connection direction of the reference points P2, and P3 as the global trajectory direction denoted by a vector $\vec{A}$, and takes the connection direction of reference points P1 and P2 as the local trajectory direction denoted by a vector $\vec{B}$. And the new data point(s) may be calculated by using the following formula:

New data point = unit reference direction vector $\vec{V}$ × estimated length $L$ + displacement point $\vec{r}$, The estimated length $L = \vec{B} \cdot \dfrac{\vec{A}}{\|\vec{A}\|}$ The unit reference direction vector $\vec{V} = \dfrac{\vec{A}}{\|\vec{A}\|}$ wherein the estimated length L is the projection amount of the vector $\vec{B}$ on the vector $\vec{A}$, the estimated length L may be calculated by the inner product of the vector $\vec{B}$ with the unit reference direction vector $\vec{V}$. The calculation formula for the new data point includes the implication of taking the projection amount of the local trajectory direction $\vec{B}$ on the global trajectory direction $\vec{A}$ as the predicted length increments (i.e., the estimated length L) of the new data point, and referring to the position of the displacement point $\vec{r}$. In the FIG. 6, the triangular mark referred by an arrow 610 is the new data point, and the displacement point is the reference point P2. The displacement point $\vec{r}$ may be the i-th smoothed data points tracked-back from a current data point in the plurality of smoothed data points, and 1<i<the number of the plurality of smoothed data points. In the exemplar, the displacement point $\vec{r}$ is, but not limited to, the second smoothed data points tracked-back from the current data point in the plurality of smoothed data points.

Figure 7:
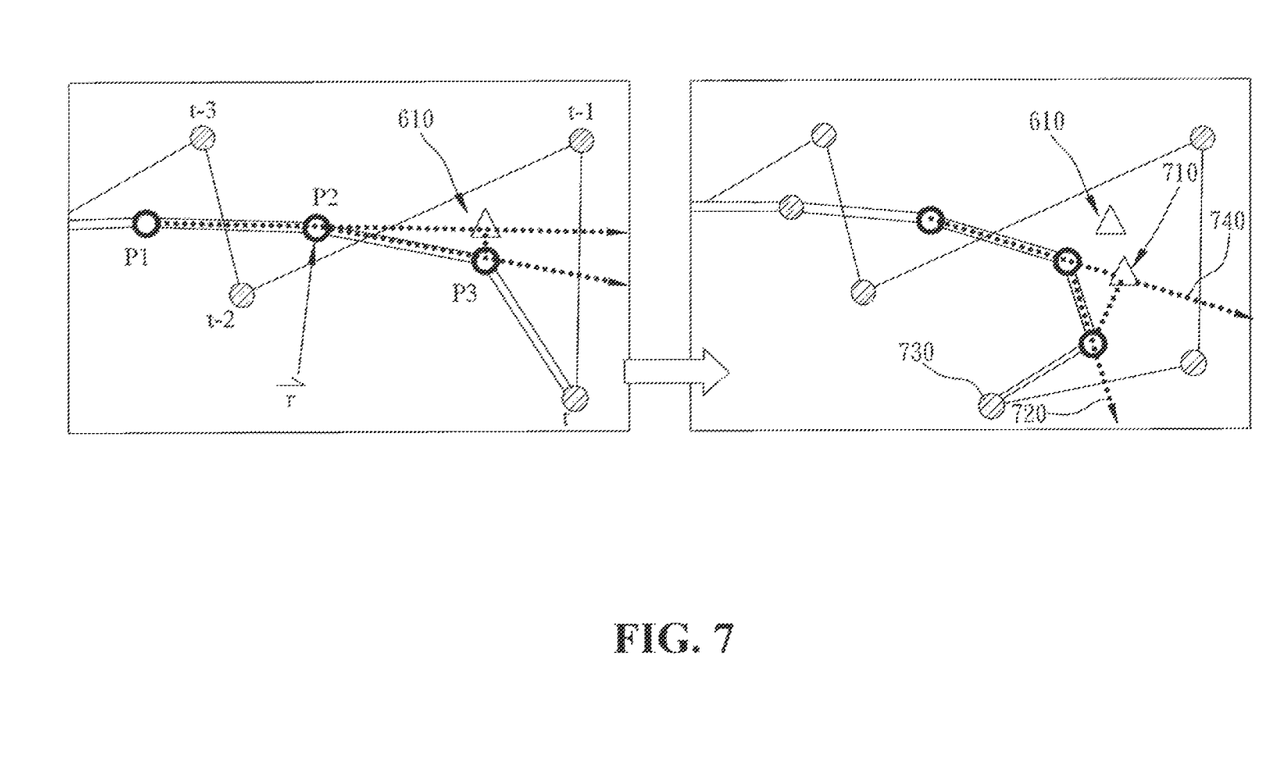
FIG. 7 shows a schematic view illustrating the effectiveness of using the projection when turning at an original data point, according to an exemplary embodiment.

In the above formula, the estimated length L is calculated by using the projection amount. FIG. 7 shows a schematic view illustrating the effectiveness of using the projection when turning at an original data point, according to an exemplary embodiment. In FIG. 7, when an original data point 730 has a turning trend, the mechanism of using the projection amount to estimate the length has a rapid reaction in response to the turning situation, and this may prevent from an over prediction for the turning situation (an over prediction situation is similar to the situation of unstoppable car). It may be observed from FIG. 7 that the local trajectory direction 720 not only reacts the current direction of the original data point 730, but also provides an appropriate buffering when the curve of original data points makes a turn, thereby maintaining the smoothness of the subsequent smoothed data points. In other words, according to the exemplary embodiments of the disclosure, under the guideline of the local trajectory direction 720, it may clearly responses to an estimated length trend 740 of the new data point 710. For example, when the original data trajectory makes a turn, under the condition of unchanged direction of the global data sequence, the estimated length of the new data point(s) with adaptive computing may be automatically shortened to facilitate turning and maintaining the smooth characteristics of the subsequent smoothed data points.

Figure 8:
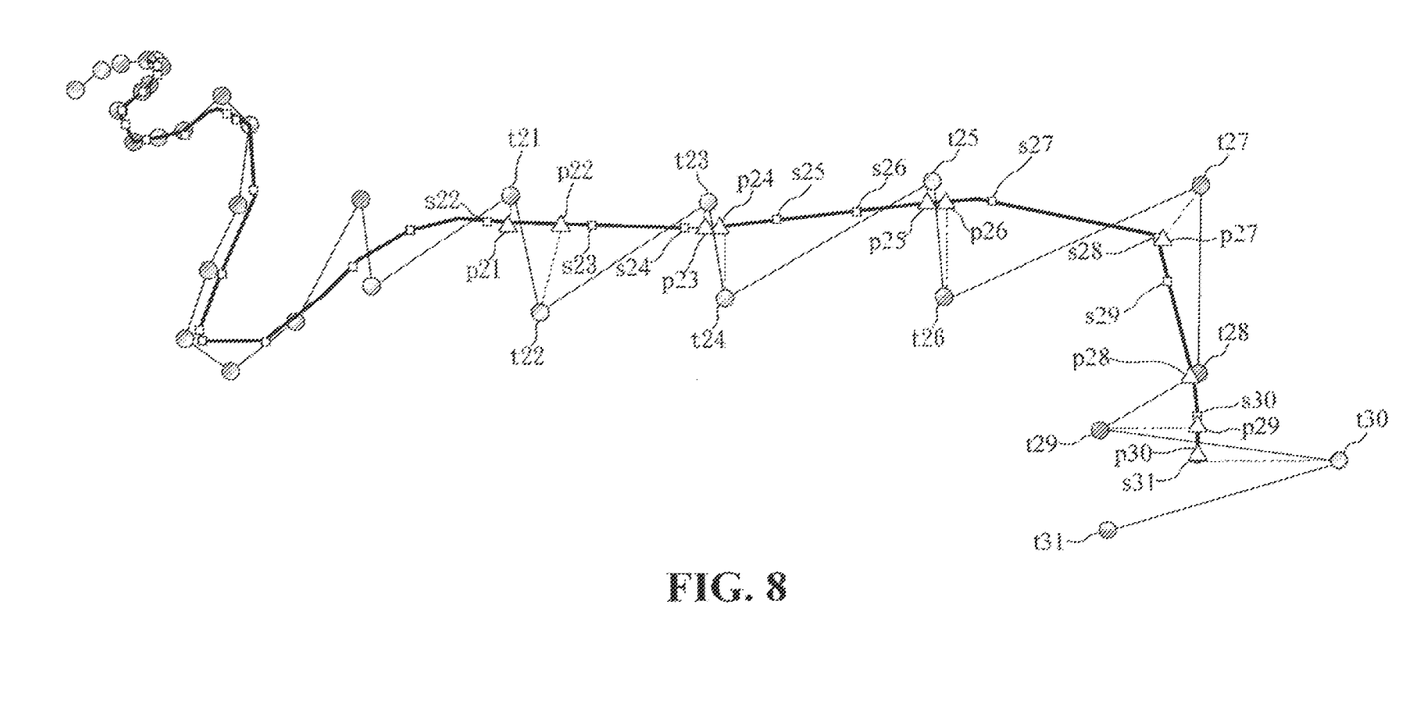
FIG. 8 shows a schematic view illustrating the estimation of the time delay, according to an exemplary embodiment.

FIG. 8 shows a schematic view illustrating the estimation of the time delay, according to an exemplary embodiment. In the exemplar of FIG. 8, the circle points connected to the thin solid line represents the trajectory of original data points, the square hollow point connected to the thick solid line represents the outputted trajectory of smoothed data points, the triangle represents the shortest distance point of the original data points to a smoothed trajectory, and the dotted line is its projection line. Assuming that corresponding smoothed data point of the original data point t1 is s1, the shortest distance point of the original data point t1 to the smoothed trajectory is p1, and so on. The time delay of each smoothed data points to the original data points is calculated as described below. It may be observed from the relative relationship between the triangles and black circles in FIG. 8. Take the delay calculation of the smoothed data point s30 as an example. The smoothed data point s30 is on the smoothed trajectory and locates between the points p29 and p28, therefore, the time delay d30 of the smoothed data point s30 to the original data point t30 meets the relationship (30−29=1)<d30<(30−28=2). Take another example of delay calculation of the smoothed data point s27. The smoothed data points s27 locates between p26 and p27, therefore, the time delay d27 of the smoothed data points s27 to the original data points t27 satisfies the relation 0<d27<1. Since the spacing distribution of sample points of the smoothed curve is similar to the spacing distribution of the original data points, the exemplary embodiments of the disclosure use curve fitting by taking the tracked-back second smoothed data point from the current data point as the projection location reference point (i.e., the displacement point $\vec{r}$), thus it may estimate an average time delay of approximate 0~2 sampling points.

Figure 9A:
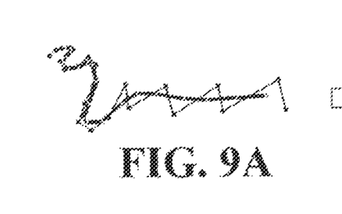
Figure 9B:
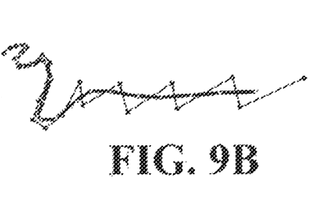
Figure 9C:
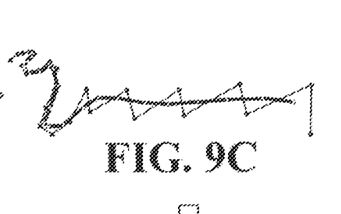
Figure 9D:
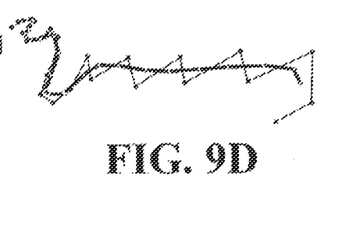
Figure 9E:
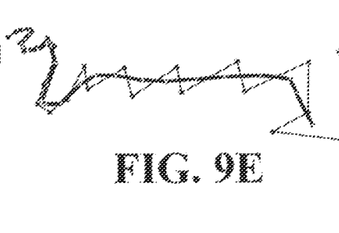
Figure 9F:
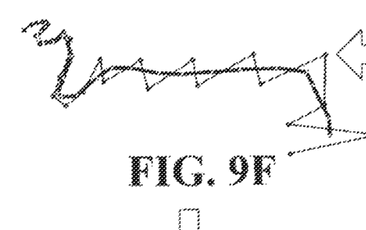
Figure 9G:
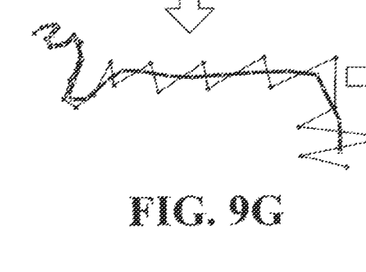
Figure 9H:
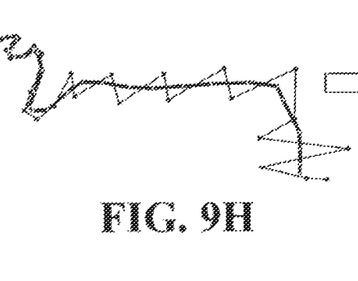
Figure 9I:
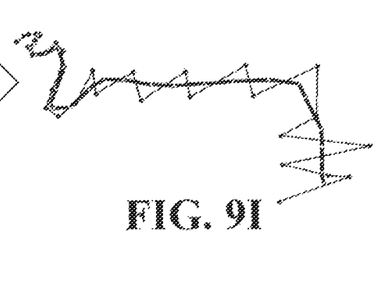

FIG. 9A to FIG. 9I show a schematic views illustrating the inputted original trajectory incrementing with time and the outputted smoothed trajectory, according to an exemplary embodiment, wherein black dots represent the original data points, and the original trajectory is a trajectory formed by the segments connected to these the original data points. Square hollow points represent the smoothed data points, and the smoothed trajectory is a trajectory formed by the smoothed data points based on the disclosed exemplary embodiments of the smoothing technique. Assuming that FIG. 9A shows the original trajectory at a current time t and the outputted smoothed trajectory, then FIG. 9B shows the original trajectory at time t+1 and the outputted smoothed trajectory, and so on. FIG. 9I shows the original trajectory at time t+8 and he outputted smoothed trajectory.

Figure 10:
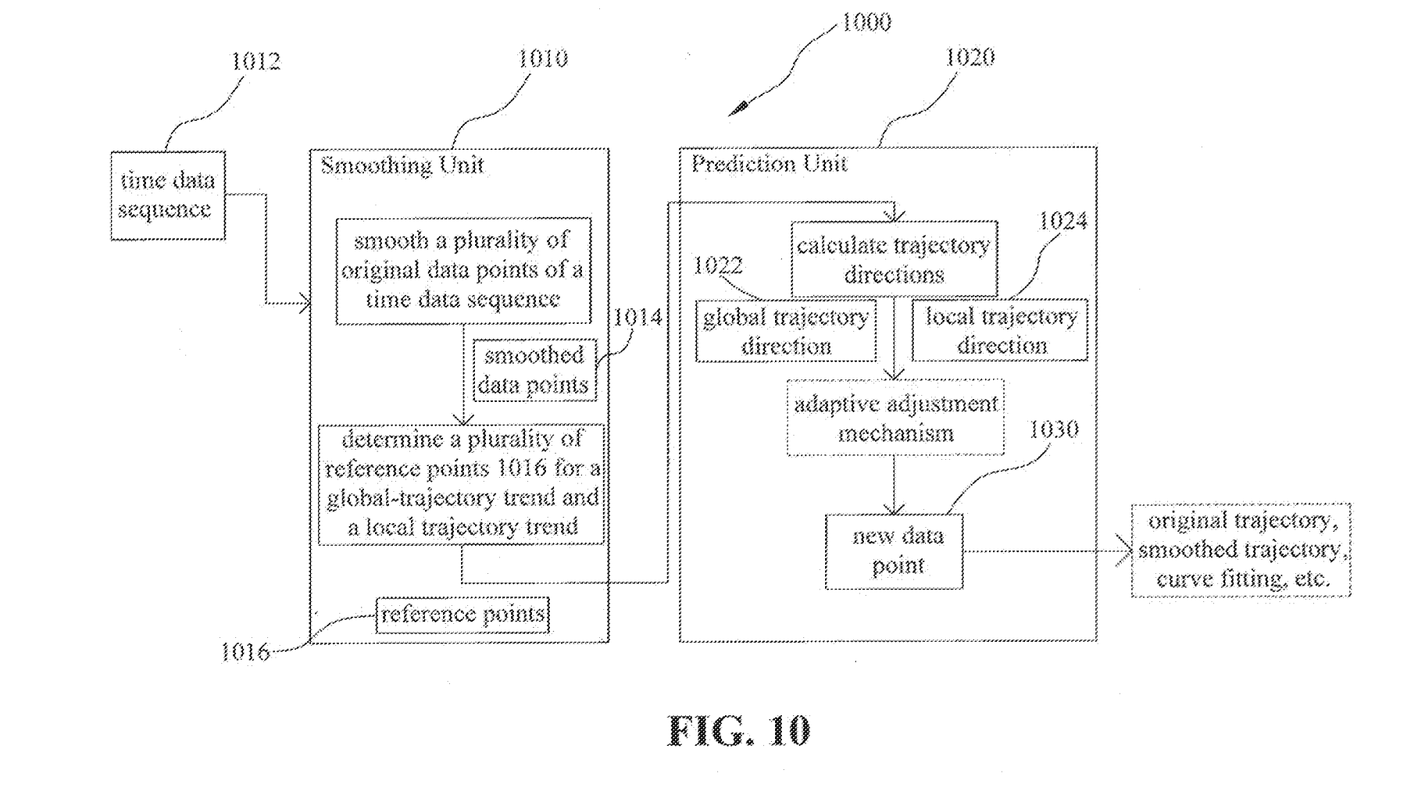
FIG. 10 shows a smoothing apparatus for time data sequences, according to an exemplary embodiment.

Accordingly, FIG. 10 shows a smoothing apparatus for time data sequences, according to an exemplary embodiment. Referring to FIG. 10, the smoothing apparatus 1000 comprises a hardware-implemented smoothing unit 1010 and a hardware-implemented prediction unit 1020. The hardware-implemented smoothing unit 1010 is configured to smooth a plurality of original data points of a time data sequence 1012, and determine a plurality of reference points 1016 for a global-trajectory trend and a local trajectory trend, from a plurality of smoothed data points 1014. The hardware-implemented prediction unit 1020 is configured to calculate trajectory directions including a global trajectory direction 1022 and a local trajectory direction 1024 according to the plurality of reference points 1016, and adaptively calculate at least one new data point 1030 by integrating the global trajectory direction 1022 and the local trajectory direction 1024. The hardware-implemented prediction unit 1020 may further generate the original trajectory incrementing with time, the smoothed trajectory, the curve fitting, etc. The trajectory of new data may also maintain the properties of smoothness and real-time perception.

As previously described in the exemplary embodiments of the disclosure, the plurality of original data points are a plurality of historical original data points by tracking back the time data sequence 1012 from a current time. The hardware-implemented smoothing unit 1010 may use smoothing mechanism such as interpolation, or regression, or curve fitting to smooth the historical original data points. The hardware-implemented smoothing unit 1010 may also use such as the aforementioned exemplary embodiments, to determine the reference point of the global-trajectory trend and the local-trajectory trend, which is not repeated here. The hardware-implemented prediction unit 1020 may use the aforementioned adaptive adjustment mechanism to calculate the new data point(s) including such as calculating the estimated length, and deciding the reference direction vector and the displacement point, which is not repeated here. The hardware-implemented smoothing unit 1010 may use a queue with a data storage structure of first-in first-out to maintain the number of the plurality of original data points equal to the number of smoothed data points 1014, which is not repeated here. When the original data points have a turning trend, under the unchanged global trajectory direction, this adaptive adjustment mechanism may shorten the estimated length of the at least one new data point 1030 to facilitate turning and maintaining the smoothing characteristics of the subsequent smoothed data points.

Following the above mentioned, the smoothing method and apparatus according to the disclosed exemplary embodiments is a prediction mechanism using the global and the local trajectory trends, and is a smoothing technology of using simple algebraic operations for time data sequences. This smoothing technology may apply to such as computer input devices, game consoles, home appliances manipulation, and interactive billboards.

In summary, the exemplary embodiments of the disclosure provide a smoothing method and apparatus for time data sequences. This technique uses prediction mechanism of global and local trajectory trends to effectively achieve the effect of real-time and smoothing trajectory trend, and uses representative specific sections of curve fitting to replace the existed steps of regress analysis for reducing the calculation amount. The technique uses only simple algebraic operations. Therefore, the required computation amount is low compared to the technology using simultaneous equation for solving and the technology using iterative optimization. In the exemplary embodiments of the smoothing method and apparatus, the time data sequence not only retains good smoothness, but also effectively controls time delay between each smoothed data point, and each original data point within 0 to 2 sampling points regardless the speed of the moving object.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smoothing method for time data sequences, the method is executed by a hardware processor to perform:
   smoothing a plurality of original data points of a time data sequence, then from a plurality of smoothed data points, determining a plurality of reference points for a current global-trajectory trend and a current local-trajectory trend;
   calculating a global trajectory direction and a local trajectory direction of the time data sequence; according to the plurality of reference points; and
   adaptively calculating at least one new data point by integrating the global trajectory direction and the local trajectory direction,
   wherein in the plurality of reference points, there are a first reference point, a second reference point and a third reference point, the first reference point is a tracked-back first smoothed data point from a current time, and ensures and responds in real-time to the current local-trajectory trend, a connection direction between the second reference point and the third reference point is a direction of a representative reference section of the current global-trajectory trend.

2. The method as claimed in claim 1, wherein in step of the smoothing the plurality of original data points of the time data sequence, the number of the original data points equals to the number of the plurality of smoothed data points.

3. The method as claimed in claim 1, wherein the adaptively calculating the at least one new data point further includes:
defining the global trajectory direction and the local trajectory direction according to the plurality of reference points; and
calculating an estimated length, and determining a reference direction vector and a displacement point.

4. The method as claimed in claim 1, wherein the plurality of original data points are a plurality of historical original data points by tracking back the time data sequence from a current time.

5. The method as claimed in claim 3, wherein the estimated length is a projection amount of the local trajectory direction on the global trajectory direction.

6. The method as claimed in claim 2, wherein the smoothing step is using a queue with a data storage structure of first-in first-out to maintain the number of the plurality of original data points equal to the number of the plurality of smoothed data points.

7. The method as claimed in claim 3, wherein the displacement point is a tracked-back i-th smoothed data point from a current data point in the plurality of smoothed data points, and i is greater than 1 and less than the number of the plurality of smoothed data points.

8. The method as claimed in claim 1, wherein the local trajectory direction responses a direction of a current data point, and provides a curve turning buffering to maintain a smoothness of a plurality of subsequent smoothed data points.

9. The method as claimed in claim 1, wherein the method further outputs an original trajectory incrementing with time, and a smoothed trajectory.

10. A smoothing apparatus for time data sequences, comprising:
a hardware-implemented smoothing unit configured to smooth a plurality of original data points of a time data sequence, and determine a plurality of reference points for a global-trajectory trend and a local-trajectory trend from a plurality of smoothed data points; and
a hardware-implemented prediction unit configured to calculate a global trajectory direction and a local trajectory direction according to the plurality of reference points, and adaptively calculate at least one new data point by integrating the global trajectory direction and the local trajectory direction,
wherein the plurality of reference points at least includes a first reference point, a second reference point and a third reference point, the first reference point is a tracked-back first smoothed data point from a current time point, and the second and the third reference points are two tracked-back successive smoothing data points of the plurality of smoothed data points from a current smoothed data point, and
the first reference point ensures and responds in real-time to the current local-trajectory trend, and a connection direction between the second and third reference points is a direction of a representative reference section of the current global trajectory.

11. The smoothing apparatus as claimed in claim 10, wherein the hardware-implemented prediction unit uses an adaptive adjustment mechanism to calculate the at least one new data point, including calculating an estimated length and determining a reference direction vector and a displacement point.

12. The smoothing apparatus as claimed in claim 11, wherein the adaptive adjustment mechanism uses a projection amount of the local trajectory direction on the global trajectory direction to calculate the estimated length.

13. The smoothing apparatus as claimed in claim 11, wherein the plurality of original data points are a plurality of tracked-back historical original data points of the time data sequence from a current time.

14. The smoothing apparatus as claimed in claim 12, wherein when an original data point has a turning trend, under the global trajectory direction unchanged, the adaptive adjustment mechanism reduces the estimated length of the at least one new data point to maintain a smoothing characteristic of a plurality of subsequent smoothed data points.

15. The smoothing apparatus as claimed in claim 12, wherein the hardware-implemented prediction unit uses a queue with a data storage structure of first-in first-out to maintain the number of the plurality of original data points equal to the number of the plurality of smoothed data points.

16. The smoothing apparatus as claimed in claim 13, wherein the hardware-implemented prediction unit further generates an original trajectory incrementing with time, and a smoothed trajectory.

\* \* \* \* \*